United States Patent
Hall et al.

(10) Patent No.: US 7,357,408 B2
(45) Date of Patent: Apr. 15, 2008

(54) INFLATABLE CURTAIN CUSHION TAB SHOCK ABSORPTION

(75) Inventors: Michael Ray Hall, Ortonville, MI (US); Thomas C. Burton, Champaign, IL (US); Eric R. Drake, Plain City, UT (US); Terry S. Jones, Salt Lake City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 261 days.

(21) Appl. No.: 11/068,662

(22) Filed: Feb. 28, 2005

(65) Prior Publication Data

US 2006/0192368 A1    Aug. 31, 2006

(51) Int. Cl.
*B60R 21/20* (2006.01)
(52) U.S. Cl. .................. 280/728.2; 280/730.2
(58) Field of Classification Search ............. 280/730.2, 280/728.2, 743.2; 188/371, 376
See application file for complete search history.

(56) References Cited

U.S. PATENT DOCUMENTS 6,099,026 A    8/2000    Ando et al. ............. 280/728.3
6,672,612 B2 *  1/2004    Sauer et al. ............. 280/730.2
2005/0206138 A1 * 9/2005  Breuninger et al. ........ 280/729

FOREIGN PATENT DOCUMENTS

GB    2 309 942    8/1997

* cited by examiner

*Primary Examiner*—Paul N. Dickson
*Assistant Examiner*—Drew J. Brown
(74) *Attorney, Agent, or Firm*—Sally J Brown; Stoel Rives LLP (57) ABSTRACT

A retention tab unit is disclosed comprising a retention tab configured for attaching an inflatable curtain to a vehicle. The retention tab unit has an energy absorption mechanism that facilitates confinement of the retention tab in an initial configuration wherein the retention tab is not taut. Once the inflatable curtain is deployed, the energy absorption mechanism is configured to release the retention tab from its initial configuration and allow it to be forced into a deployed configuration wherein the retention tab tautly extends from the vehicle.

18 Claims, 8 Drawing Sheets

Fig. 7

INFLATABLE CURTAIN CUSHION TAB SHOCK ABSORPTION

TECHNICAL FIELD

The present invention relates generally to the field of automotive protective systems. More specifically, the present invention relates to inflatable curtain air bags for automobiles.

BRIEF DESCRIPTION OF THE DRAWINGS

Understanding that the accompanying drawings depict only typical embodiments of the invention and are not therefore to be considered to be limiting of its scope, the invention will be described and explained with specificity and detail in reference to the accompanying drawings. The appended drawings are listed below.

DETAILED DESCRIPTION OF PREFERRED EMBODIMENTS

The invention described hereinafter relates to inflatable curtain airbags and more specifically to the retention tabs used to mount airbag modules. An energy absorption mechanism is disclosed that relieves some of the tension on the retention tabs during deployment of the airbag. A person of ordinary skill in the art will understand that the principles of the invention as herein described are applicable to a wide variety of different embodiments and configurations. These general principles, however, will be discussed with reference to the embodiments depicted in the accompanying figures.

Figure 1A:
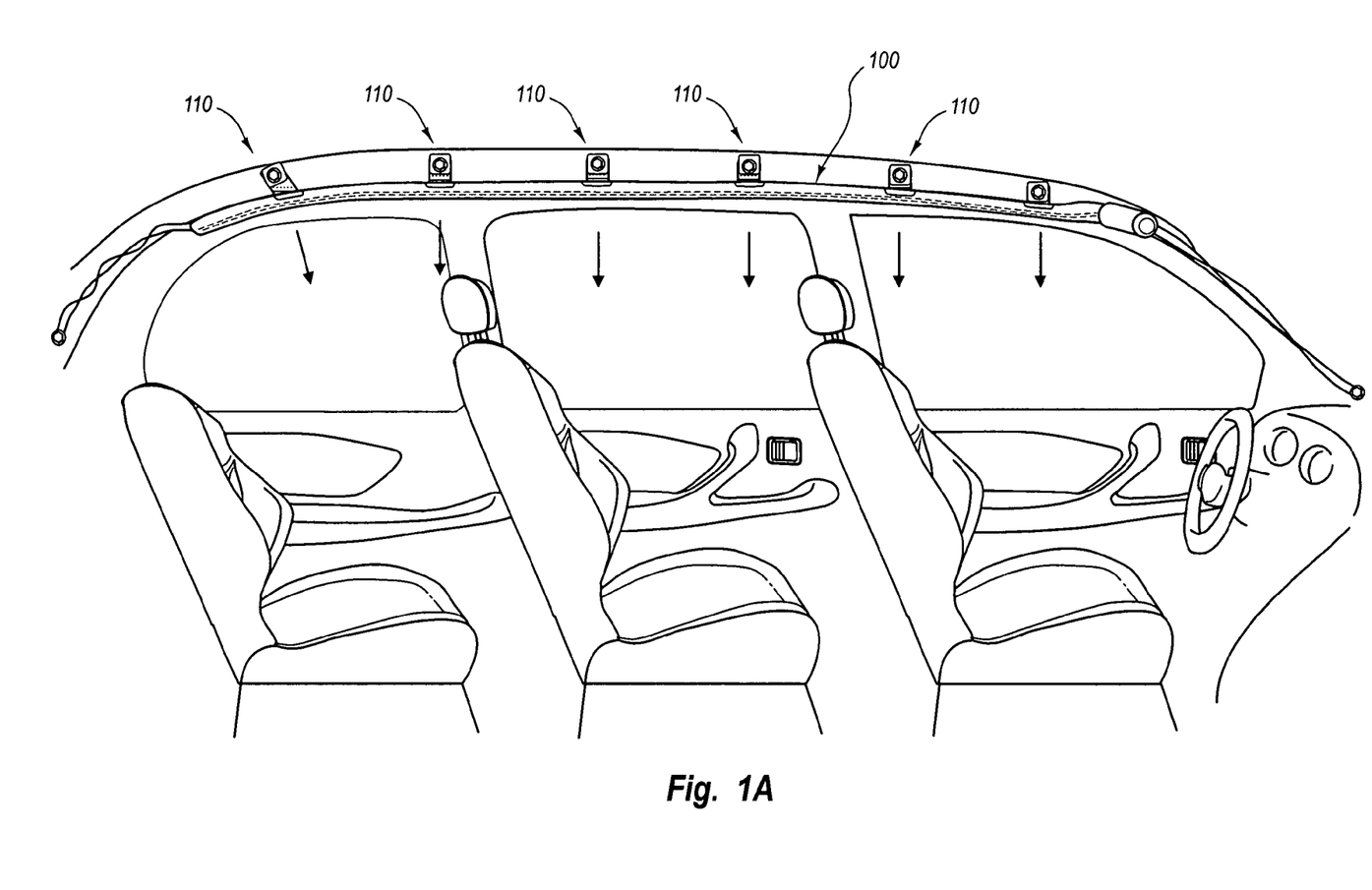
FIG. 1A is a perspective view of the interior of a vehicle incorporating an air bag module.
Figure 1B:
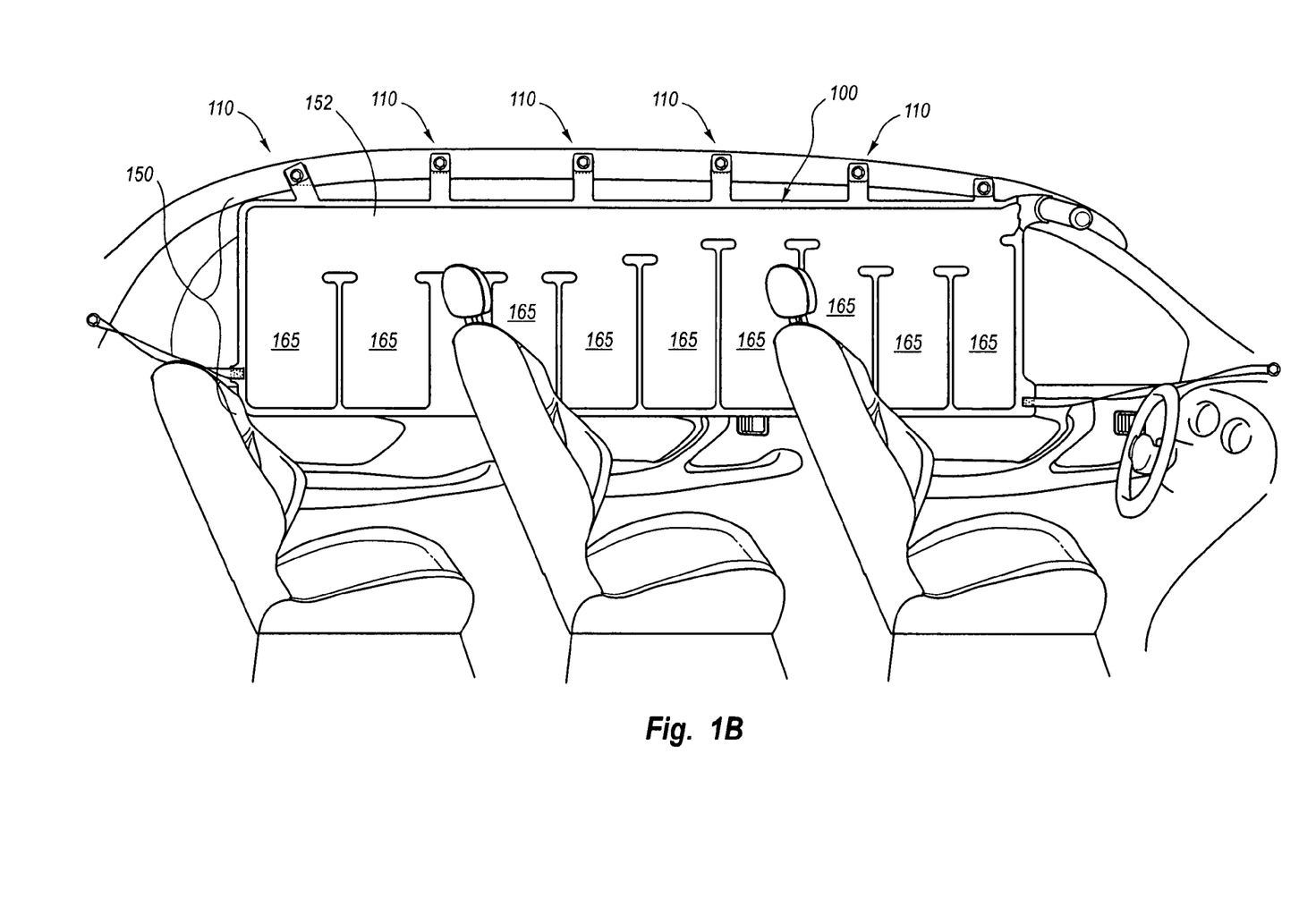
FIG. 1B is a perspective view of the interior of a vehicle with a deployed air bag module.

With reference first to FIGS. 1A and 1B, an inflatable curtain airbag module 100 is depicted. Module 100 comprises an inflatable cushion 150 made up of an inflatable portion 152 having a plurality of chambers 165. A plurality of retention tab units 110 extend along the top edge of module 100. It should be understood that, whereas the embodiments depicted in the accompanying figures include a plurality of tabs, embodiments of the invention could be designed with a single retention tab. Such a retention tab may be elongated such that it extends along the entire or a substantial portion of the inflatable curtain near its top portion. One or more of the retention tab units 110 have an energy absorption mechanism, as will be discussed in greater detail later.

FIG. 1B depicts module 100 mounted within a vehicle. Whereas FIG. 1B shows module 100 prior to deployment with its cushion 150 in a compacted configuration. As will be understood by a person having ordinary skill in the art, the module may be compacted in any of several ways. For instance, it may be rolled or folded in a compacted configuration. It should be appreciated that any suitable configuration for compacting the module for placement within a vehicle may be employed. The compacted module shown in FIG. 1A is shown in FIG. 1B as un-compacted following deployment.

Figure 2A:
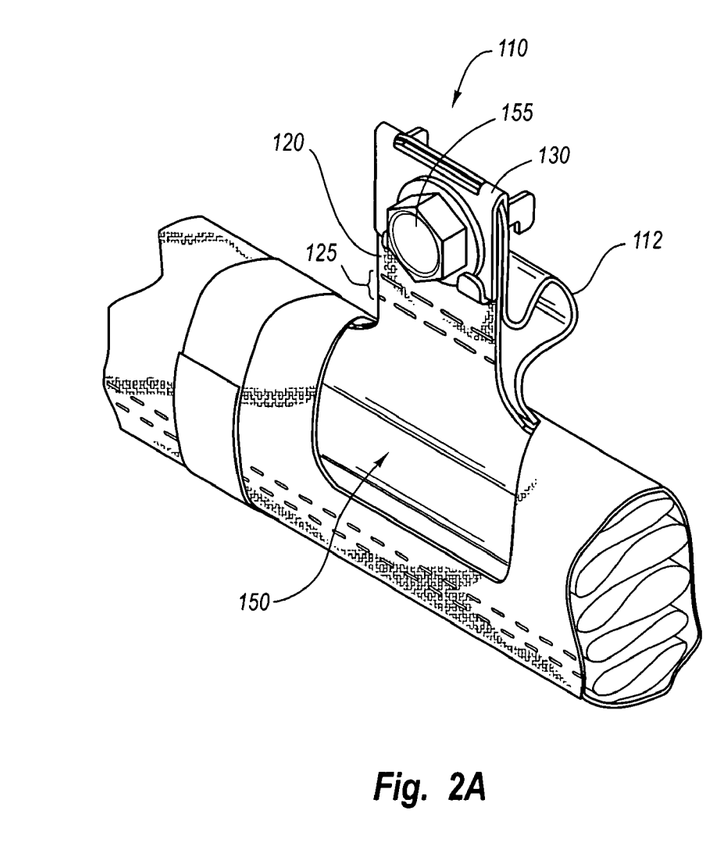
FIG. 2A is a perspective view of one embodiment of the invention in an initial configuration.
Figure 2B:
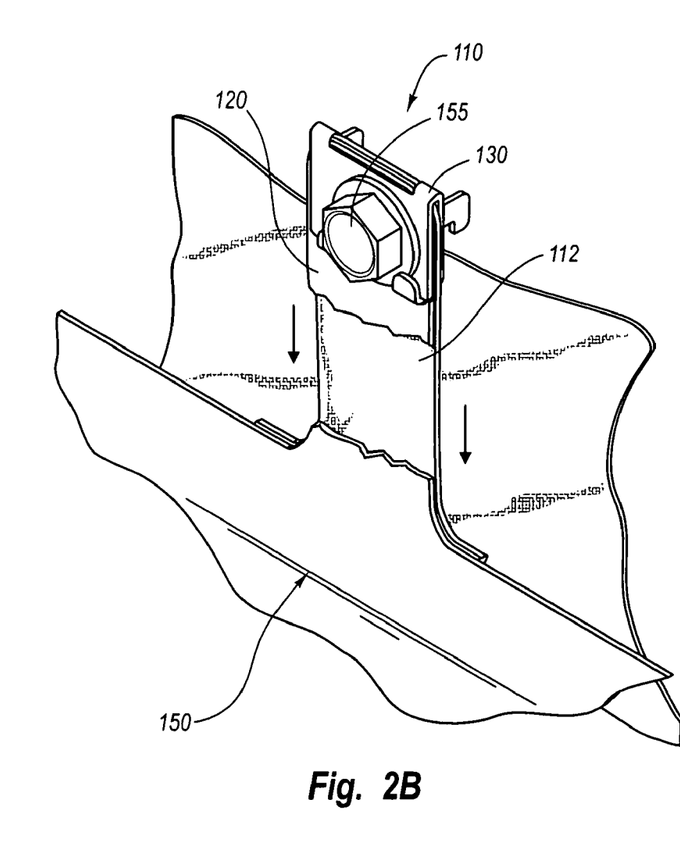
FIG. 2B is a perspective view of the embodiment shown in FIG. 2A in a deployed configuration.

With reference now to FIG. 2A, an embodiment of a retention tab unit is shown at 110 in greater detail. This depicted embodiment of a retention tab unit 110 comprises a retention tab 112 and a sacrificial retention tab 120, each of which generally extend from the same general base portion. Tabs 112 and 120 may be integrally formed with cushion 150 or may be sewn or otherwise attached thereto by any available methodology. Likewise, tabs 112 and 120 may extend integrally from the same piece of material or may be attached to one another as shown in FIGS. 2A-2B. Thus, retention tab units in accordance with the principles of the invention may be integrally formed with cushions and air bag modules or, alternatively, may be retrofit with existing cushions/modules. Of course, one of retention tabs 112 or 120 may be integrally woven or otherwise formed with the cushion while the other may be sewn or otherwise attached thereto in a secondary process if desired. In the depicted embodiment of the invention, retention tab 112 is longer than sacrificial retention tab 120, for reasons that are made apparent below. However, as will be discussed later, this aspect of the retention tab units is not necessary and some embodiments of the invention may have retention tab(s) of the same or shorter length than that of the sacrificial retention tab(s). Retention tab 112 and sacrificial retention tab 120 may be bound or otherwise held together via a retention tab bracket 130 or other suitable binding structure. The retention tab bracket may have an aperture which generally corresponds in position with an aperture in the retention tab to allow for receipt therethrough by a bolt or other anchoring structure such as bolt 155 in FIGS. 2A-2B.

Sacrificial tab 120 includes a weakened portion 125. Weakened portion 125 may be configured to tear and thereby sever sacrificial retention tab 120 upon the application of a desired threshold level of tension typically corresponding to some degree with the level of tension conveyed by deployment of the inflatable curtain. Thus, in this embodiment, sacrificial retention tab 120 and weakened portion 125 thereon together comprise a frangible energy absorption mechanism.

Figure 2C:
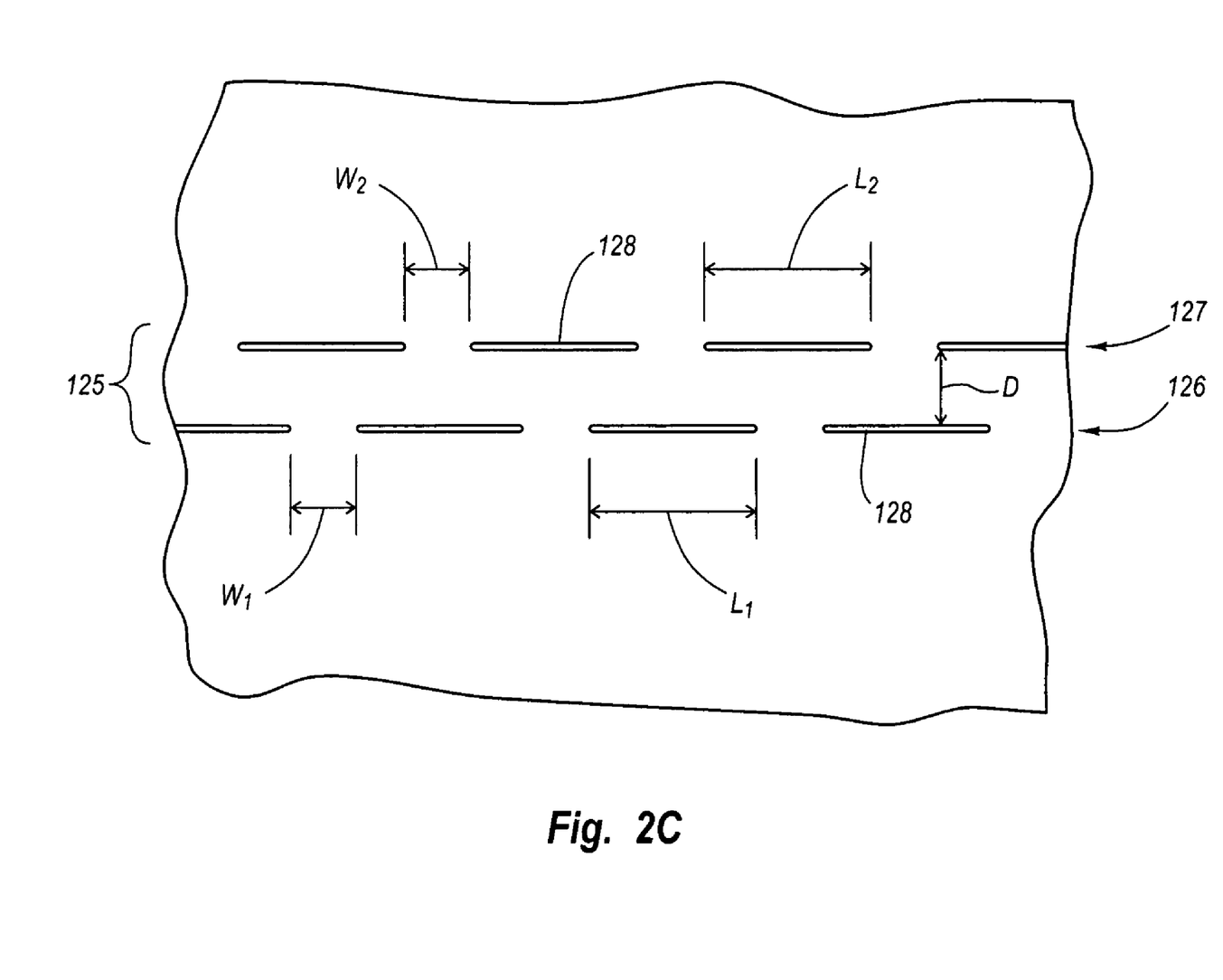
FIG. 2C is an exploded side view of a weakened portion of the sacrificial tab shown in FIGS. 2A-2B.

In FIGS. 2A-2C, weakened portion 125 comprises a first row 126 and second row 127 of slits 128. Slits 128 in rows 126 and 127 may be offset, as best seen in FIG. 2C, in order to further facilitate tearing at particular desired threshold levels of tension. FIG. 2C shows a weakened portion 125 comprising a first row 126 of slits 128 of length $L_1$ and separated by intact portions of width $W_1$. Weakened portion 125 in FIG. 2C further comprises a second row 127 of slits 128 of length $L_2$ separated from the first row 126 by a distance D and separated between slits by intact portions of width $W_2$. As best seen in FIG. 2C, slits 128 in rows 126 and 127 are offset due to the fact that a substantial number of lines perpendicular to an intact portion of one row—such as the portion of length $W_1$ in row 126 or the portion of length $W_2$ in row 127—intersect a slit in an adjacent row.

It should be understood that each of these parameters can be varied as desired to vary the relative strength of the sacrificial retention tab or its resistance to tearing. In fact, although the lengths of the slits and the width of the intact portion between slits are shown as being consistent in FIG. 2C, these may also vary as desired. Moreover, as an alternative to slits 128, perforations of any other shape, length, or size may be used.

Forming slits in adjacent slit rows in an offset configuration may be desirable, for instance, in cushions which are formed from a woven material. Tearing is facilitated by offset slits in such embodiments primarily because forming the slits in such a configuration ensures that all or substantially all yarns running approximately perpendicular to the slits will be severed at some point along their length in the desired tear region. Slits 128 or other perforations may be cut using a mechanical cutting wheel, knife, laser, water jet, plasma cutter, or any other structure or methodology available to one of skill in the art.

Figure 3A:
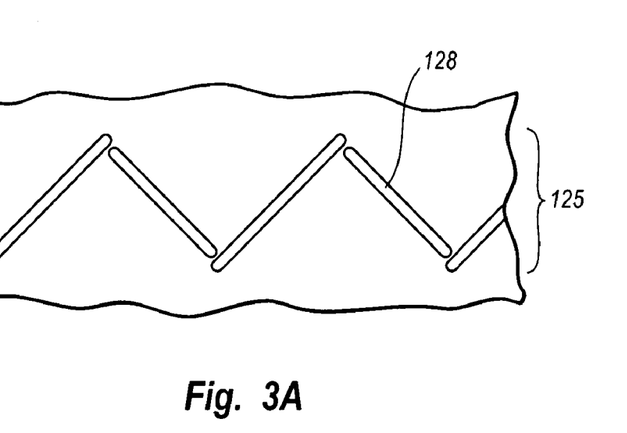
FIG. 3A is an enlarged side view of an alternative slit pattern.
Figure 3B:
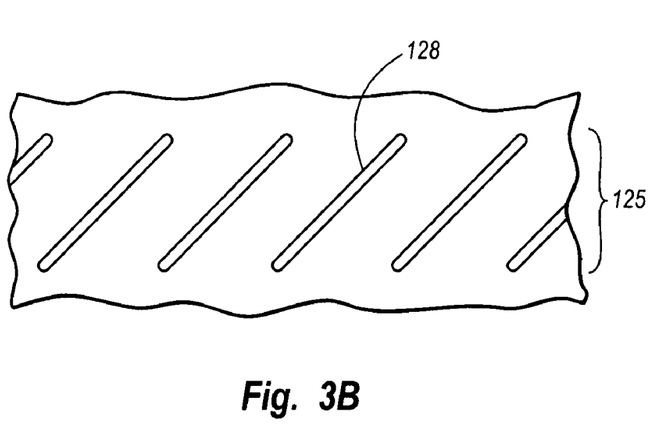
FIG. 3B is an enlarged side view of still another slit pattern.

Of course, a variety of other slit patterns may alternatively be used. For example, in FIG. 3A, a "herringbone" pattern of diagonal slits is shown. Note that each slit is positioned next to an adjacent slit such that all or substantially all vertical threads are severed by at least one slit. Still another slit pattern is shown in FIG. 3B. FIG. 3B shows a patterns consisting of diagonal, substantially parallel slits. Again, the slits are positioned such that all or substantially all vertical threads are severed by a slit and/or the slit adjacent thereto.

Figure 3C:
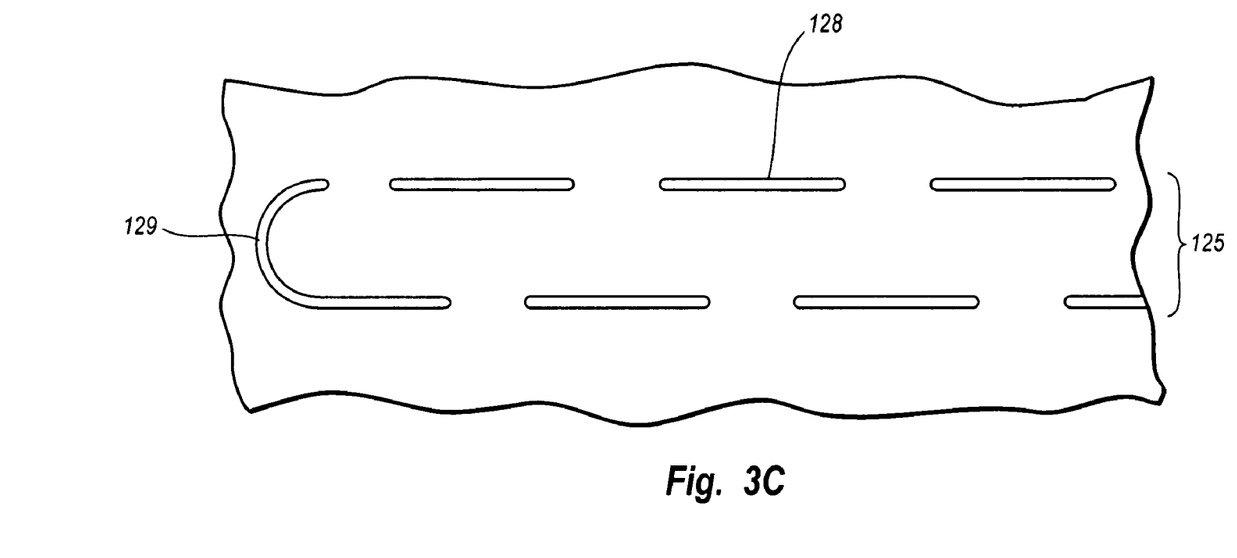
FIG. 3C is an enlarged side view of a slit pattern having a cut stop feature.

A cut stop feature may also be incorporated into the slit pattern. For instance, FIG. 3C shows a slit pattern similar to that shown in FIG. 2C but includes a cut stop feature 129 at the end of the row of slits. Such features provide a termination point for tearing along the slits and help prevent unwanted tear propagation. A variety of other cut shapes will be suitable for use as cut stop features, as will be apparent to one of skill in the art. For example, a tear-drop shaped cut may be used that extends beyond the width of the slit rows.

The weakened portion of the sacrificial retention tab 120 may alternatively be formed by a variety of other weakening steps or from a variety of other structures. Weakened portion 125 could, instead of slits, comprise a pre-severed section reattached by any available structure such that it is configured to selectively re-sever at that portion under a desired amount of tension or stress. For instance, weakened portion 125 could comprise a pre-cut section reattached by hook-and-loop fasteners, buttons, snaps, tape, or adhesives. Alternatively, weakened portion 125 could comprise a score-line or other cut or depression which weakens but does not completely sever the sacrificial retention tab 120. Any of the foregoing structures or any other structure or methodology which provides for a weakened portion 125 on the sacrificial retention tab 120 such that, upon the application of a sufficient amount of tension, sacrificial retention tab 120 will typically sever at the weakened portion 125 should be considered within the scope of the foregoing version of the invention.

Before sacrificial retention tab 120 has been severed, retention tab 112 is considered to be in its initial configuration, as shown in FIG. 2A. When the inflatable curtain airbag module 100 has been mounted within a vehicle in this configuration, retention tab 112 may be configured such that it is not taut. In other words, most or all of the tension applied to the retention tab unit 110 may be on sacrificial retention tab 120. In FIG. 2A, this is clearly seen as retention tab 112 does not extend in a plane (or a straight line cross section) from its top side to the area at which it is attached or otherwise meets inflatable cushion 150. Instead, retention tab 112 has some slack which extends away from sacrificial retention tab 120. Of course, it should be understood that it is not necessary for there to be slack which extends away from sacrificial retention tab 120. Instead, the retention tab may extend essentially parallel to the sacrificial retention tab without being taut like the sacrificial retention tab. It is for the foregoing reasons that the retention tab(s) will typically be longer than the sacrificial retention tab(s). However, this is also not necessary. Some embodiments of the invention may have sacrificial retention tab(s) of the same or a greater length than that of the retention tab(s). In such embodiments, the sacrificial retention tabs may be mounted to the vehicle in a different location than the retention tabs such that the tension is primarily applied to the sacrificial retention tabs prior to deployment.

Thereafter, the force from deployment of the airbag (shown by the arrows in FIG. 2B) ruptures the sacrificial retention tab 120 and forces the retention tab 112 into a flat or planar configuration. Once the inflatable curtain has been deployed and has severed the sacrificial retention tab 120, retention tab 112 is considered to be in its deployed configuration, as shown in FIG. 2B. In its deployed configuration, retention tab 112 may be taut from the tension of at least partially holding up the deployed air bag. Sacrificial retention tab 120 with weakened portion 125—or any other energy absorption mechanism within the scope of the invention—should therefore facilitate confinement of a retention tab in its initial configuration until the inflatable curtain is deployed, at which time it is configured to release the retention tab from its initial configuration and allow it to be forced into its deployed configuration by the energy of the inflatable curtain deployment.

Figure 4A:
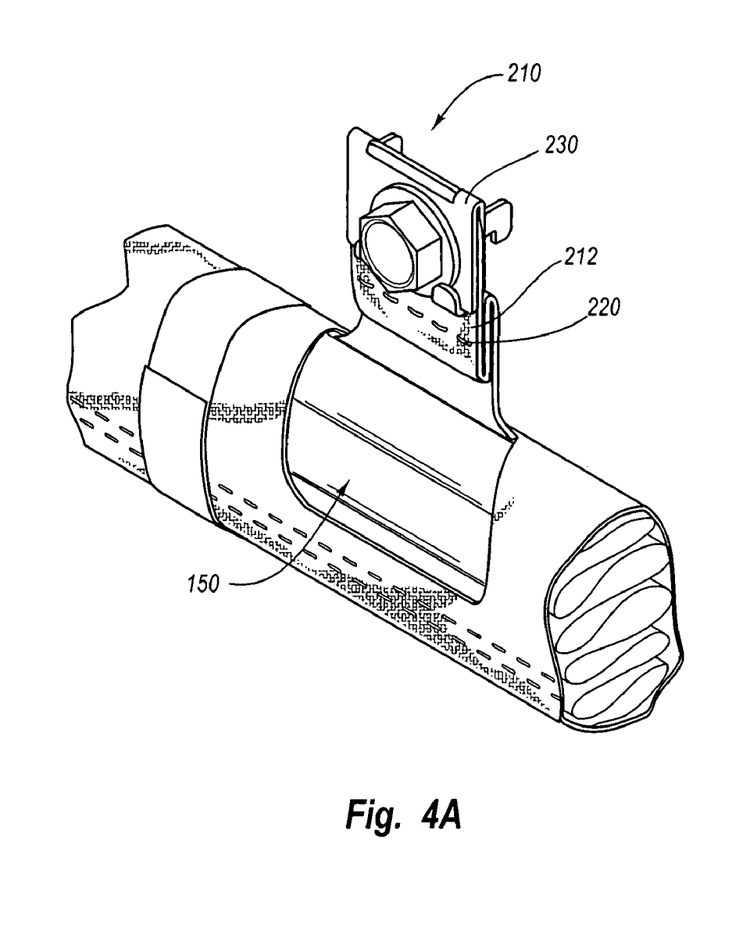
FIG. 4A is a perspective view of a second embodiment of the invention in an initial or folded configuration.
Figure 4B:
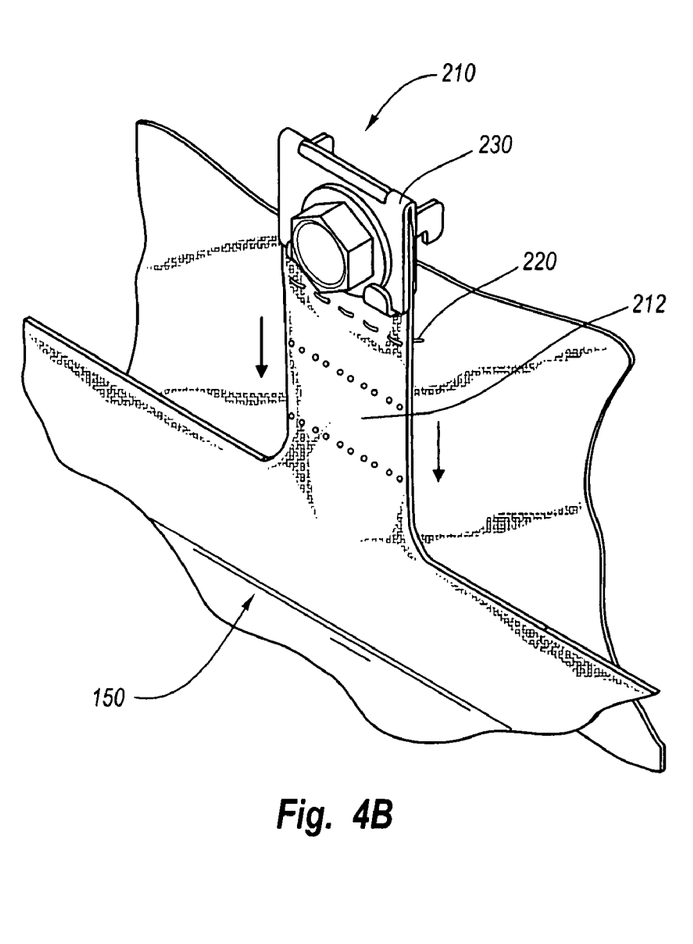
FIG. 4B is a perspective view of the embodiment shown in FIG. 3A in a deployed configuration.
Figure 5A:
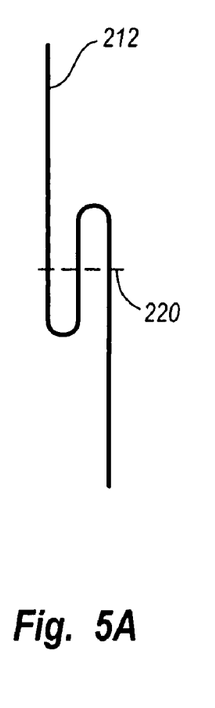
FIGS. 5A-5E are cross-sectional views of an embodiment of the invention during deployment.
Figure 5B:
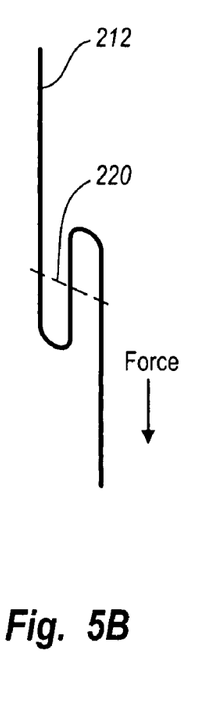
Figure 5C:
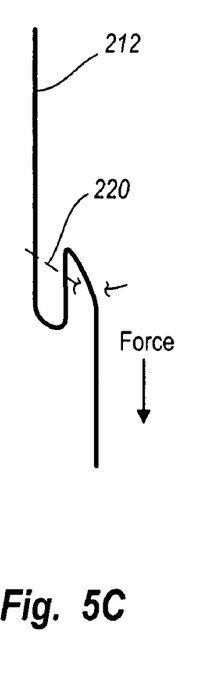
Figure 5D:
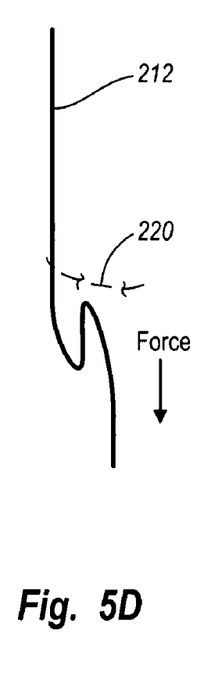
Figure 5E:
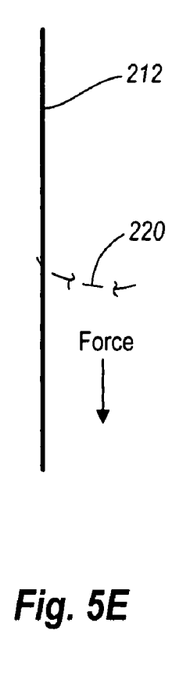
Figure 6:
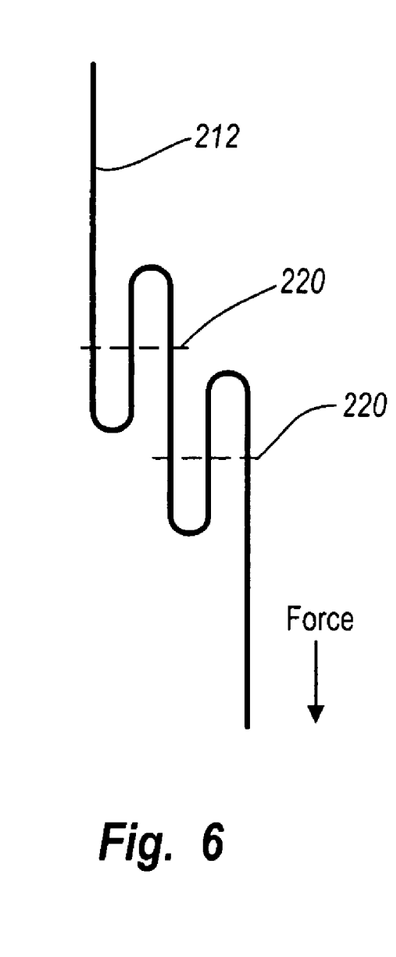
FIG. 6 is a cross-sectional view of another embodiment of the invention in its initial or folded configuration.
Figure 7:
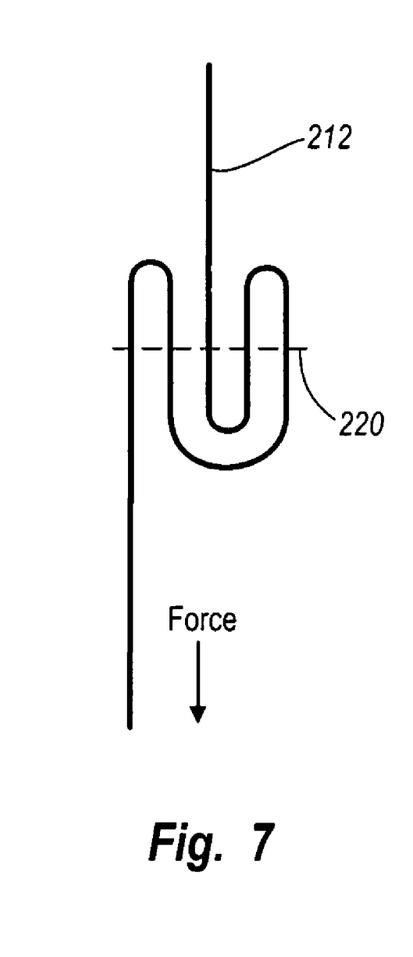
FIG. 7 is a cross-sectional view of yet another embodiment of the invention in its initial or folded configuration.

Another version of the invention is depicted in FIGS. 4A-5E, with other embodiments of this version depicted in FIGS. 6-7. FIG. 4A shows a retention tab unit 210 comprising a retention tab 212. In this version of the invention, tab 212 may be shortened by folding it back on itself twice such that it has a generally S-shaped cross section as best seen in FIGS. 5A-5E.

Tab 212 may be held or confined in this initial or folded configuration also with an energy absorption mechanism, which in the embodiments depicted in the accompanying figures comprises one or more breakaway stitches 220. Stitch 220 may be sewn into or otherwise connected with the folds of the foldover design to temporarily hold tab 212 in its initial folded configuration. Once the inflatable curtain has been deployed, stitch 220 is preferably designed to break or otherwise disengage from the folds of tab 212, thereby allowing tab 212 to unfold into a deployed configuration as shown in FIG. 4B.

FIGS. 5A-5E illustrate in step-like fashion an embodiment of a detention tab unit being forced from its initial or folded configuration into its deployed configuration. FIG. 5A shows the detention tab unit in its initial or folded configuration. In FIG. 5B, the inflatable curtain (not shown) has been deployed and, accordingly, a downward force represented by the arrow on FIGS. 5B-5E has been applied to the detention tab unit. FIGS. 5C and 5D show the breakaway stitch 220 being disengaged from the folds of the detention tab 212. Finally, FIG. 5E shows the detention tab 212 in its deployed configuration.

It should be understood that many design variations are possible. For example, the detention tab 212 may include folds in multiple portions of the tab with multiple stitches 220, as shown in FIG. 6. Detention tab 212 may be folded back on itself several times—any number of times in fact—with the same stitch or stitching 220, or multiple stitches/stitching, used to bind all of the folds together. This concept is illustrated in FIG. 7, which depicts an embodiment including four folds of the retention tab 212 at the same general location and bound by stitch 220.

Alternatively, structures other than a stitch could be used to confine the detention tab in its folded or initial configuration. One or more folds could be maintained, for instance, by use of one or more pieces of hook-and-loop fasteners in between the folds, by use of staples, bands, snaps, or other such structure, or with some form of adhesive or tape. Thus, embodiments of this version of the invention may employ an energy absorption mechanism or a frangible energy absorption mechanism. Any of the foregoing structures, and any other structure capable of temporarily maintaining a detention tab in a folded configuration until sufficient tension is applied thereto to force the detention tab into an unfolded deployed configuration, should be considered within the scope of the invention. All such structures are also examples of means for temporarily confining the retention tab in its initial configuration until the inflatable curtain is deployed, and for enabling the retention tab to be released from its initial configuration such that it is forced into its deployed configuration by the energy of the inflatable curtain deployment.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. An inflatable curtain module comprising:
    an inflatable curtain comprising an inflatable portion;
    a plurality of retention tabs configured for attaching the inflatable curtain to a vehicle such that the inflatable portion is below the retention tabs after attachment, wherein each retention tab has a folded portion which is folded against itself; and
    wherein each retention tab comprises a frangible energy absorption mechanism configured to temporarily hold the folded portion of each retention tab in its folded configuration, wherein the frangible energy absorption mechanism is configured such that, upon deployment of the inflatable portion of the inflatable curtain, the frangible energy absorption mechanism breaks and no longer holds the retention tab in its folded configuration and the retention tab moves to a deployed configuration,
        wherein the initial folded configuration prevents the retention tabs from being both taut and fully extended, and wherein a greater amount of the length of each retention tab tautly extends to support the inflatable portion of the curtain below the retention tabs once the retention tabs are in the deployed configuration as compared with the folded configuration of the retention tabs.

2. The module of claim 1, wherein the frangible energy absorption mechanism comprises at least one stitch.

3. The module of claim 1, wherein the frangible energy absorption mechanism comprises a plurality of stitches.

4. The module of claim 1, wherein each retention tab is folded against itself twice in a first location while in the folded configuration.

5. The module of claim 4, wherein each retention tab is folded against itself twice in a second location while in the folded configuration which is separate from the first location.

6. The module of claim 1, wherein each retention tab is folded against itself at least four times in the same general location.

7. The module of claim 1, wherein the distance between the top of each retention tab and the bottom of each respective retention tab in the folded configuration is less than the distance between the top of each retention tab and the bottom of each respective retention tab in the deployed configuration such that the length of the retention tabs in their deployed configuration controls the position of the inflatable portion of the deployed curtain.

8. An inflatable curtain module comprising:
    an inflatable curtain comprising an inflatable portion;
    a retention tab extending from the module and configured for attaching the inflatable curtain to a vehicle; and
    a sacrificial retention tab extending from generally the same portion of the module as the retention tab, wherein the sacrificial retention tab has a weakened portion which allows the sacrificial retention tab to be severed during deployment of the inflatable curtain;
    wherein the retention tab is longer than the sacrificial retention tab.

9. The module of claim 8, wherein the weakened portion comprises at least two rows of slits, and wherein the rows of slits are offset such that a substantial number of lines perpendicular to an intact portion of one row intersect a slit in an adjacent row.

10. The module of claim 8, wherein the weakened portion of the sacrificial retention tab comprises a slit pattern, wherein the slit pattern is configured such that all or substantially all vertical threads in the sacrificial retention tab are severed by at least one slit.

11. The module of claim 10, wherein the slit pattern comprises a herringbone pattern.

12. The module of claim 8, wherein the weakened portion is formed by a laser cut.

13. The module of claim 8, wherein the weakened portion comprises perforations.

14. The module of claim 8, wherein the weakened portion comprises a pre-severed portion that has been reattached.

15. The module of claim 8, wherein the retention tab is elongated such that it extends along a substantial portion of the inflatable portion of the inflatable curtain.

16. The module of claim 8, wherein the inflatable curtain module comprises a plurality of the retention tabs.

17. The module of claim 8, wherein the retention tab has an initial configuration when attached to a vehicle and is adapted to have a deployed configuration, wherein the initial configuration prevents the retention tab from being both taut and fully extended, and wherein a greater amount of the length of the retention tab tautly extends to support the curtain once the retention tab is in its deployed configuration as compared with the initial configuration of the retention tab.

18. The module of claim 17, wherein the distance between the top of the retention tab and the bottom of the retention tab in the initial configuration is less than the distance between the top of the retention tab and the bottom of the retention tab in the deployed configuration such that the length of the retention tab in its deployed configuration controls the position of the inflatable portion of the deployed curtain.

* * * * *